MORTISE LOCK DEADLOCKING LATCH AND DEADBOLT BLOCK

Original Filed April 23, 1965 3 Sheets-Sheet 1

FRED J. RUSSELL
ROGER J. NOLIN
INVENTORS

BY Beehler & Arant
ATTORNEYS

MORTISE LOCK DEADLOCKING LATCH AND DEADBOLT BLOCK

Original Filed April 23, 1965 3 Sheets-Sheet 2

FRED J. RUSSELL
ROGER J. NOLIN
INVENTORS

BY Beehler & Grant
ATTORNEYS

MORTISE LOCK DEADLOCKING LATCH AND DEADBOLT BLOCK

Original Filed April 23, 1965 3 Sheets-Sheet 3

FRED J. RUSSELL
ROGER J. NOLIN
INVENTORS

BY Beehler & Grant
ATTORNEYS

United States Patent Office

Re. 26,677
Reissued Oct. 7, 1969

26,677

MORTISE LOCK DEADLOCKING LATCH AND DEADBOLT BLOCK

Fred J. Russell, Beverly Hills, Calif. (8635 Otis St., South Gate, Calif. 90281), and Roger J. Nolin, Monterey Park, Calif.; said Nolin assignor to said Russell Original No. 3,337,251, dated Aug. 22, 1967, Ser. No. 450,472, Apr. 23, 1965. Application for reissue Nov. 24, 1967, Ser. No. 689,741

Int. Cl. E05c *9/10;* E05b *59/00, 63/14*

U.S. Cl. 292—34 4 Claims

Matter enclosed in heavy brackets [ ] appears in the original patent but forms no part of this reissue specification; matter printed in italics indicates the additions made by reissue.

*ABSTRACT OF THE DISCLOSURE*

*This invention relates to a lock comprising a latch bolt, a deadbolt and an auxiliary bolt. When the auxiliary bolt is projected it allows retraction of the latch bolt and prevents projection of the deadbolt. When the auxiliary bolt is retracted it blocks retraction of the latch bolt and allows projection of the deadbolt. The auxiliary bolt blocks the projected latch bolt by rotating a detent into blocking position behind it and prevents projection of the deadbolt by blocking movement of a slider connected to the deadbolt.*

The subject matter of the invention here under consideration consists of the employment of an auxiliary bolt which, when depressed by engagement with a strike plate, blocks pry-back of the latch bolt by unauthorized means. The mechanism additionally includes elements which act in response to authorized means, such as rotation of a spindle or a key-actuated mechanism, to withdraw the latch bolt despite the depressed condition of the auxiliary bolt.

Although the auxiliary bolt mechanism here under consideration may be found useful in a variety of types of door locks, it has been found especially advantageous for use in a mortise type lock, namely one which fits into a recess which has been cut into the door from the free edge of the door. When a rugged, high quality type lock is needed, mortise locks often are selected. Typical installations for a high quality mortise type lock are installations for hotels, hospitals, and schools. Because, in supplying these various installations, different performance characteristics are frequently demanded, it is advantageous to construct a mortise type lock which is versatile to the extent that certain parts of the mechanism can be readily changed to produce different functional results, without there being need to change the balance of the lock construction. A structure of this kind is quite helpful in limiting inventory, while at the same time providing a lock which is readily convertible to fit most needs.

Because of the security demanded of locks of this kind, there is frequent demand for having them equipped with an auxiliary bolt like that here made reference to, an auxiliary bolt capable of blocking the latch bolt against the prospect of being pried back when the door is in closed condition. Although blocking expedients have been reasonably well known heretofore, special means for unblocking must be provided in a mortise type lock which will make unblocking possible by manipulation of any one of several of the means which may be employed for normally withdrawing the latch bolt.

It is therefore among the objects of the invention to provide a new and improved auxiliary bolt for blocking a possible pry-back of the latch bolt which is relatively simple in its construction and operation, both from the point of view of blocking and from the point of view of releasing the blocking adjustment from any one of several different locations.

Another object of the invention is to provide a new and improved blocking mechanism for preventing pry-back for a reciprocation latch bolt by unauthorized means, the parts of which can be readily incorporated into a somewhat versatile and relatively complex mortise type lock, without need for altering the remainder of the mortise lock mechanism to any appreciable degree.

Still another object of the invention is to provide a new and improved auxiliary bolt mechanism for blocking a latch bolt against pry-back by unauthorized means which is relatively simple and which further includes sundry safety factors which will prevent damage to other portions of the lock mechanism which might otherwise be present except for the multiple functioning attributes of the auxiliary bolt.

With these and other objects in view, the invention consists in the construction, arrangement, and combination of the various parts of the device, whereby the objects contemplated are attained, as hereinafter set forth, pointed out in the appended claims, and illustrated in the accompanying drawings.

Figure 1:
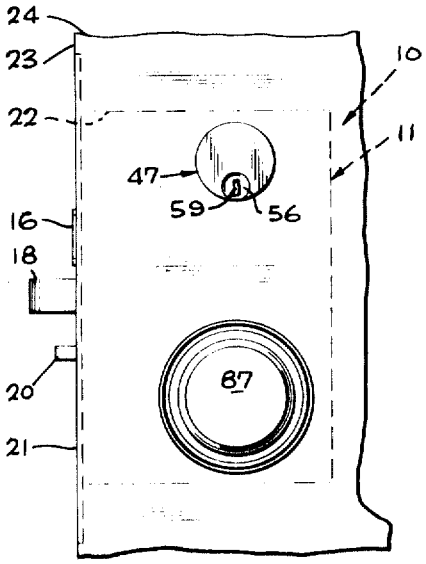
FIGURE 1 is a side elevational view of a fragment of a door, showing a mortise type lock mounted therein.
Figure 2:
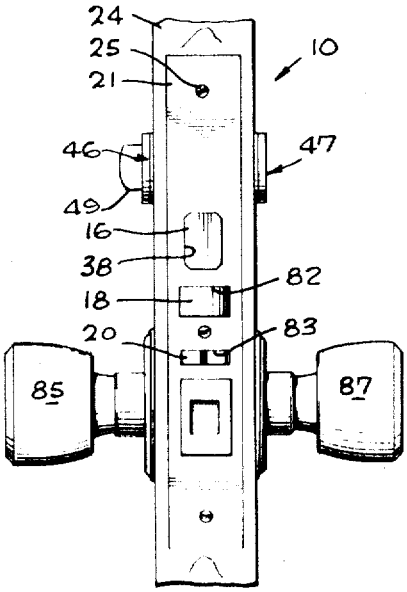
FIGURE 2 is an end elevational view of the installation of FIGURE 1.
Figure 5:
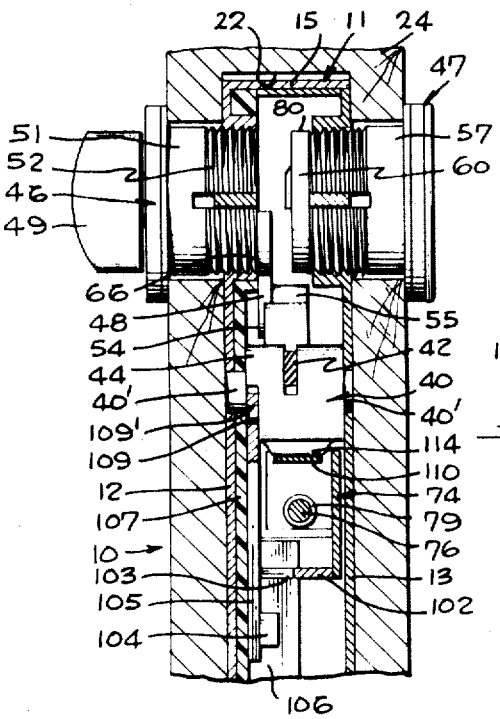
FIGURE 5 is a fragmentary longitudinal sectional view on the line 5—5 of FIGURE 4.
Figure 6:
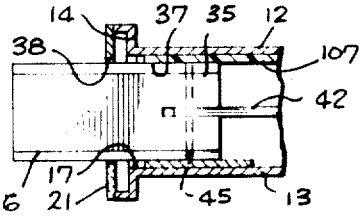
FIGURE 6 is a fragmentary horizontal sectional view on the line 6—6 of FIGURE 4.

A lock construction especially well adapted to the invention here under consideration is shown and described in copending applications Ser. No. 450,461, filed Apr. 23, 1965, now U.S. Patent 3,316,003; Ser. No. 450,450, filed Apr. 23, 1965, now U.S. Patent 3,298,729; Ser. No. 450,447, filed Apr. 23, 1965; Ser. No. 450,460, filed Apr. 23, 1965; Ser. No. 450,446, filed Apr. 23, 1965; Ser. No. 450,462, filed Apr. 23, 1965, now U.S. Patent 3,316,-006.

In an embodiment of the invention which has been selected as one for showing a typical arrangement of structural parts involving the invention, there is shown a mortise type lock indicated generally by the reference character 10, substantially all of which is housed within a case 11. An inside wall 12 and an outside wall 13, forming part of the case 11, form a chamber between them, one end of which is defined by an outside end wall 14 and the other end of which is defined by an inside end wall 14'. A top wall 15 and bottom wall 15' complete the enclosure of the chamber.

The mortise type lock 10 is provided with a deadbolt 16 reciprocatably mounted in a rectangular hole 17 in the outside end wall 14 and with a latch bolt 18 reciprocatably mounted in an extension 17' of the rectangular hole 17. An auxiliary bolt 20 is reciprocatably mounted in a relatively smaller rectangular hole 19 in the outside end wall 14. An armored front plate 21 is adapted to overlie the outside end wall 14 and to be attached thereto by screws 25. The case 11 is mounted within a recess 22 extending inwardly from an end edge 23 of a door 24, there being provided screws (not shown) which attach the outside end wall 14 to the end edge 23 of the door 24.

Figure 4:
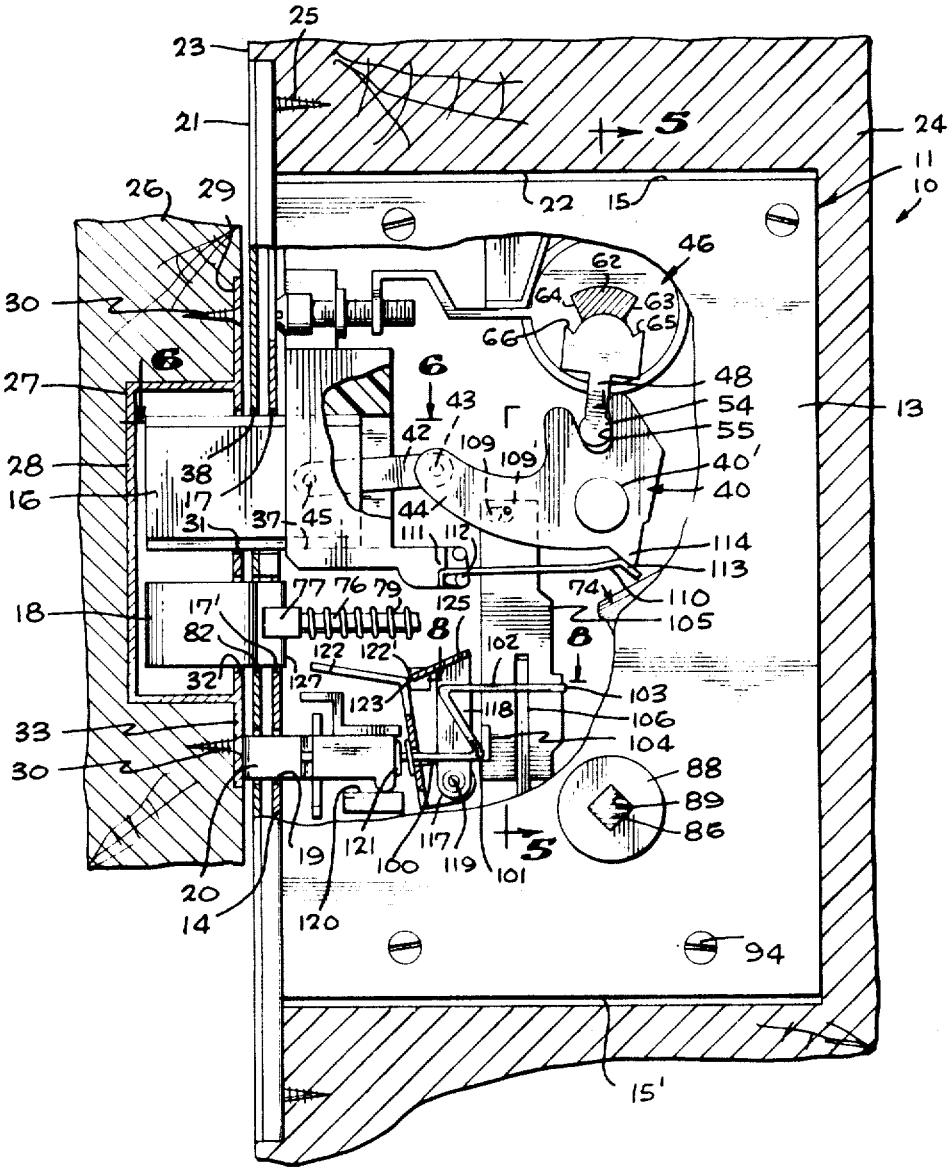
FIGURE 4 is a view similar to FIGURE 3 but showing the relationship of the parts with the door in closed position in cooperation with a strike plate on the door frame.

On a door frame 26, as viewed in FIGURE 4, there is provided a recess 27 which accommodates a box 28, on the outer end of which is a strike plate 29 secured to the door frame 26 by screws 30. In the strike plate 29 is an opening 31 adapted to receive the dead bolt 16 and a second opening 32 adapted to receive the latch bolt 18. An extension 33 of the strike plate 29 provides a surface against which the auxiliary bolt 20 engages so that the auxiliary bolt 20 will be depressed when the door 24 is in the closed position of FIGURE 4.

For mounting the dead bolt 16 in its position in the case 11, there is provided a block 35 which may, if desired, be of nonmetallic material, the block 35 being anchored in position by suitable means (not shown). A slide away 37 extending through the block 35 reciprocatably mounts the dead bolt 16 therein, there being provided an opening 38 in the armored front plate 21 in alignment with the rectangular hole 17 in the outside end wall 14.

For manipulating the dead bolt 16, there is provided a rock arm 40 provided with bearing 40' pivotally mounted respectively in the inside wall 12 and the outside wall 13 of the case 11. A link 42 is pivotally secured by a pivot connection 43 to an end 44 of the rock arm 40. The other end of the link 42 is attached to the dead bolt 16 by a pivot connection 45. On the inside wall 12 of the case 11 there is provided a turn mechanism, indicated generally by the reference character 46. Opposite the turn mechanism 46 and mounted on the outside wall 13 of the case 11 is a key-actuated mechanism, indicated generally by the reference character 47. Through an appropriate actuator 48, the dead bolt 16 can always be operated by the turn mechanism 46 by rotating the handle 49 and can be operated by the key-actuated mechanism 47 when an appropriate key is inserted and turned therein. The actuator 48 has at its outer end a rounded driver 54 which fits in a pocket 55 in the rock arm 40 so that when the driver 54 is rotated either clockwise or counterclockwise, as viewed in FIGURES 3 and 4, the rock arm 40 can be rotated in one direction or the other, thereby to reciprocate the dead bolt 16. The turn mechanism 46 is contained within a housing 51 mounted upon the inside wall 12 by means of a threaded engagement 52.

To operate the dead bolt 16 by means of a key-actuated mechanism 47, there is provided the usual key plug 56, in which is a keyway 59. At the inner end of the key plug 56 is an eccentrically mounted disk 60, from which extends a boss 62 which travels about a center point 61. Ends 63 and 64 of the boss 62 are adapted to move against one or another of the shoulders 65 or 66 of the actuator 48 to pivot the actuator 48 in one direction or another for its movement in the pocket 55.

Figure 3:
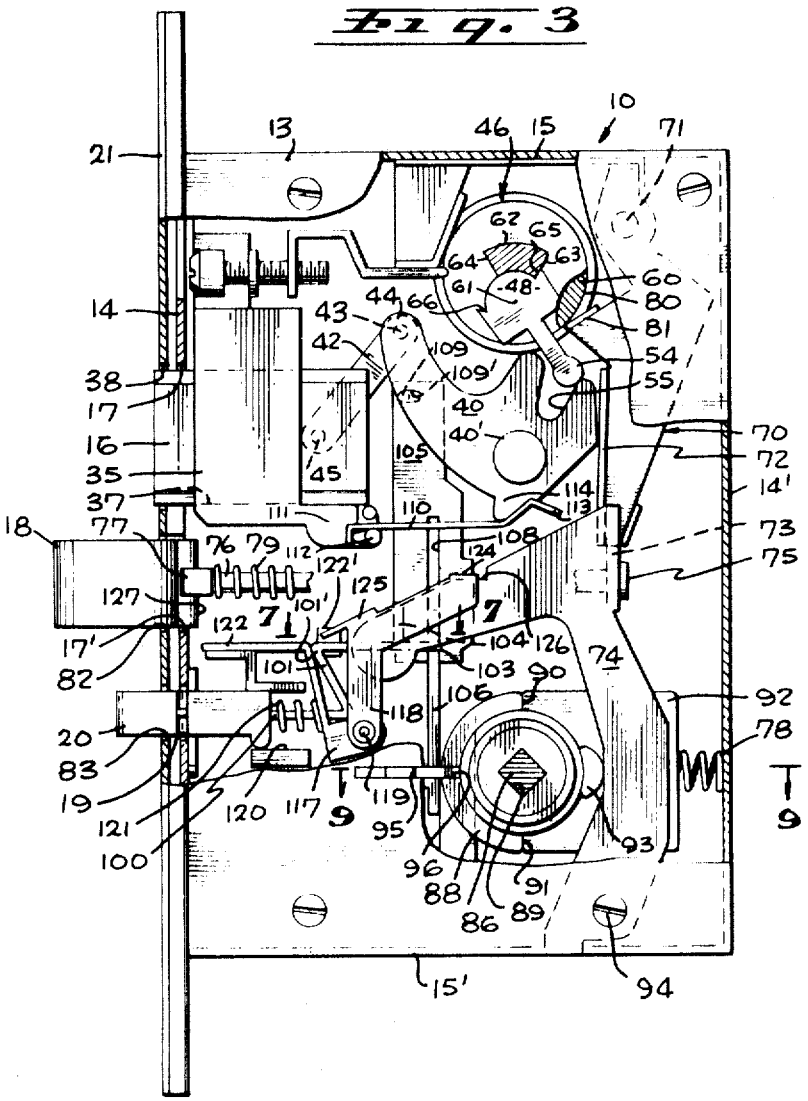
FIGURE 3 is a side elevational view, substantially broken away, showing the relationship of operating parts of the mechanism in the position they would have with the door open.
Figure 9:
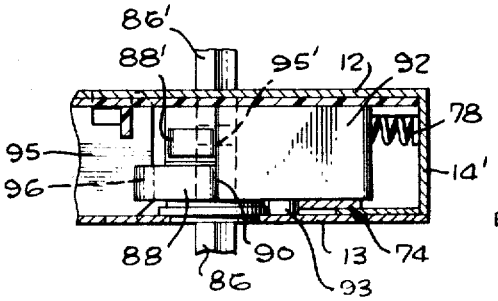
FIGURE 9 is a fragmentary cross sectional view taken on the line 9—9 of FIGURE 3.

The latch bolt 18 may be operated in a number of different ways, as, for example, by manipulation of an inside knob 85, an outside knob 87, the turn mechanism 46, or the key-actuated mechanism 47. For operating the latch bolt 18 by means of the outside knob 87, for example, there is provided a square spindle 86 nonrotatably attached to the outside knob 87, and the square spindle 86 fits in a square hole 89 in a rollback 88. For clockwise rotation of the rollback 88, an end 90 moves against a block 92 and shifts the block 92 from left to right, as viewed, for example, in FIGURE 3. For counterclockwise rotation, an end 91 of the rollback 88 would move against the block 92 and accomplish the same result. A cam 93 forming part of the block 92 then moves against a rollback link 74, causing it to pivot in a clockwise direction about a pivot point 94. A head 75 of a latch bolt rod 76 overlies the rollback link 74 and is then caused to move in a direction from left to right, as viewed in FIGURE 3. Since the latch bolt rod 76 is attached to the latch bolt 18 by means of a pivotal connection 77, the latch bolt 18 is accordingly withdrawn against tension in a coiled spring 79. At the same time, the block 92 moves against a return spring 78. The latch bolt 18 may also be moved by manipulation of the inside knob 85 through a similar rollback 88' on a spindle 86', having ends (not shown) similar to 90, 91 likewise acting against the block 92 in the same fashion. It will be understood that, in the mortise lock assembly here shown, the outer rollback 88 with the outside knob 87, as viewed in FIGURE 3, is blocked from rotation by a slide 95 in the case 11 which is in engagement with the slot 98 in the rollback 88.

Should it be desired to manipulate the latch bolt 18 by operation of the key-actuated mechanism 47, then rotation of an arcuate, off-center cam way 80 on the tail disk 60 moving against a cam plate 81 on an actuator link 70 pivoted, as shown, by a pivot pin 71 causes the actuator link 70 to pivot in a counterclockwise direction. A flange 72 on the actuator link 70 moves against a flange 73 on the rollback link 74 causing the rollback link 74 to rotate in a clockwise direction, thereby to move against the head 75 of the latch bolt rod 76 and withdraw the latch bolt 18 attached to it. As shown, the latch bolt 18 mounted in the extension 17' of the rectangular hole 17 extends outwardly through an aligned hole 82 in the armored front plate 21.

The auxiliary bolt 20 which is mounted in the rectangular hole 19 in the outside end wall 14 extends outwardly through a similar rectangular hole 83 in the armored front plate 21.

Figure 7:
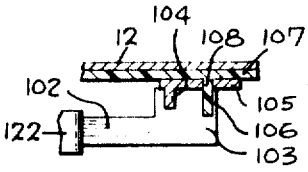
FIGURE 7 is a fragmentary horizontal sectional view on the line 7—7 of FIGURE 3.
Figure 8:
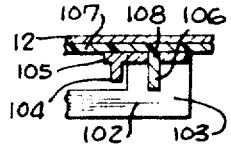
FIGURE 8 is a fragmentary sectional view similar to FIGURE 7 but taken on the line 8—8 of FIGURE 4.

On the inner end of the auxiliary bolt 20 is an auxiliary bolt lever 100 which has at its inner end a forwardly and upwardly extending diagonal arm 101 terminating at its upper end 101' in a horizontal arm 102. Attention is directed to FIGURES 7 and 8 in connection with FIGURES 3 and 4 for an explanation of this portion of the mechanism. In the relationship of parts illustrated in FIGURES 3 and 7, the relatively wide extension 103 underlies a stop flange 104 on a vertically reciprocating strip 105 and prevents the vertically reciprocating strip 105 from moving downwardly. The strip 105 is guided in its movement by a guide flange 106 sliding in a vertical slot 108 in the strip 105, the guide flange 106 being part of a liner plate 107. The purpose of this is to prevent extension of the dead bolt 16 when the door 24 is open. This is accomplished by employment of a pin 109 extending laterally from the rock arm 40 into a horizontally elongated hole 109' in the strip 105. Clearly, therefore, when the strip 105 cannot move downwardly, the rock arm 40 cannot be rotated by any means, and, therefore, the dead bolt 16 cannot be extended.

In this connection, attention is called to a leaf spring 110 secured to anchoring elements 111 and 112 of the block 35 in a position such that a free end 113 of the leaf spring 110 engages one side or the other of a projection 114 on the rock arm 40 to releasably hold it either in the withdrawn position of FIGURE 3 or the extended position of FIGURE 4.

When the door 24 is in closed position as shown in FIGURE 4, the dead bolt 16 can be extended. This is permitted because the auxiliary bolt 20 is then depressed by engagement with the extension 33 of the strike plate 29, and the extension 103 of the horizontal arm 102, attached to the auxiliary bolt 20, is shifted from the position of FIGURE 7 toward the right to the position of FIGURE 8. This movement removes the extension 103 from beneath the stop flange 104, and this permits the strip 105 to slide freely downwardly. Accordingly, there is no impediment to rotation of the rock arm 40, and the rock arm 40 can then be rotated, either by the turn mechanism 46 or the key-actuated mechanism 47 to move the dead bolt 16 into the locked or unlocked position.

The auxiliary bolt 20, of course, performs a double function in that, when it is depressed in closed position of the door 24 illustrated in FIGURE 4, pry-back of the latch bolt 18 is blocked. Therefore, even if the dead bolt 16 is not extended into a locked position, the latch bolt 18 cannot be pried back to open the door 24 by unauthorized means when the outside knob 87 is made rigid by the engagement of slide 95 in slot 98, as shown in FIGURE 3.

This blocking by the auxiliary bolt 20 is accomplished by employment of a bell crank 117 pivotally secured to the case 11 by a pivot pin 119. When the auxiliary bolt 20 slides in an appropriate slideway 120 inwardly against a compression spring 121, the compression spring 121 presses against the bell crank 117. At the same time, the upper end 101' is moved away from the rear end of the bell crank 117, and the bell crank 117 pivots in a clockwise direction about the pivot pin 119 until a blocker 122 forming part of the bell crank 117 rises from the position of FIGURE 3 to the position of FIGURE 4, where it is stopped by engagement with a stop 122' which is fixedly attached to the inside wall 12. When the blocker 122 is in this position, the latch bolt 18 can be moved only a short distance until an inner end 127 engages the blocker 122, after which the latch bolt 18 cannot be moved any further. Should the auxiliary bolt 20 be released, the upper end 101' would be moved toward the left against the diagonal arm 101. Since the force of the compression spring 121 at the upper end of the diagonal arm 101 is much greater than the force of the outer end of a coil of the spring against the opposite side of the diagonal arm 101, the diagonal arm 101, and accordingly the bell crank 117, would be pivoted sharply in a counterclockwise direction and withdraw the blocker 122 to the unblocked position of FIGURE 3.

A bracket 118 is also pivotally mounted upon the pivot pin 119 and is prevented from rotating clockwise about the pivot pin 119 when pressed upon by the blocker 122, because a flange 124 on an arm 125 of the blocker limiting bracket is prevented from moving rotationally downwardly because it engages a lifting shoulder 126 on the rollback link 74 which, at this moment, is stationary, as illustrated in FIGURE 3.

In order to withdraw the latch bolt 18 and open the door 24, while the auxiliary bolt 20 remain depressed, it is necessary to remove the blocker 122 from its position behind the latch bolt 18. This is accomplished by rotation of the rollback link 74 in a clockwise direction about the pivot point 94, as view in FIGURE 3. When the rollback link 74 is rotated as heretofore described, the lifting shoulder 126 moves in a generally upward direction against the flange 124 and causes the bracket 118 to rotate slightly in a counterclockwise direction, as viewed in FIGURE 3, about the pivot pin 119. The movement is sufficient to move an end 123 of the bracket 118 against the rear of the blocker 122, thereby to rotate the bell crank 117 in a counterclockwise direction, as viewed in FIGURES 3 and 4, about the pivot pin 119 far enough so that the blocker 122 moves out of alignment with the latch bolt 18. By reason of there being a clearance between the inner end 127 and the blocker 122, the blocker 122 can clear before the latch bolt 18 is withdrawn in the usual fashion.

Of course, the rollback link 74 can be moved in the manner described by operation of the outside knob 87, when unlocked, or by the inside knob 85. It also can be manipulated by operation of the actuator link 70 when moved by operation of the key-actuated mechanism 47, as also previously described. Therefore, although the latch bolt 18 can be securely blocked against pry-back, it can be freely manipulated when it is to be withdrawn by authorized means through the agency of the mechanisms heretofore described. Further, it will be apparent from the foregoing description that the auxiliary bolt 20 performs a double function, namely that of preventing pry-back of the latch bolt 18 when the door 24 is closed and that of preventing inadvertent extension of the dead bolt 16 when the door 24 is open.

While the invention has herein been shown and described in what is conceived to be the most practical and preferred embodiment, it is recognized that departures may be made therefrom within the scope of the invention, which is not to be limited to the details disclosed herein, but is to be accorded the full scope of the claims so as to embrace any and all equivalent devices.

We claim:

1. In a lock including a case, a latch bolt assembly reciprocatably mounted in said case, a rollback mechanism including a spindle rotatably mounted in said case, a rollback link in operable engagement with said spindle, said latch bolt assembly being in operative engagement with said rollback mechanism, an auxiliary bolt member reciprocatably mounted in said case for blocking said latch bolt assembly against pry-back when the auxiliary bolt member is in depressed position, a blocker member having a pivotal mounting in said case for movement between a blocking position behind said latch bolt assembly and an unblocking position removed from said latch bolt assembly, a yieldable connection between said auxiliary bolt member and said blocker member adapted to pivot said blocker member into blocking position behind said latch bolt assembly when said auxiliary bolt member is in depressed condition, a bracket movably mounted in said case, said bracket having a position of engagement with said blocker member on one vertical side of said pivotal mounting when said blocker member is in blocking position, said rollback link having a pivotal mounting in said case on the other vertical side of said pivotal mounting, and means for moving said blocker member from blocking position, said means including a lifting shoulder on said rollback link and a lifted shoulder on said bracket in overlying engagement with said lifting shoulder, whereby said blocker member is rotated out of the position which blocks retraction of said latch bolt by operation of said rollback mechanism while said auxiliary bolt member is depressed.

2. In a lock including a case, a dead bolt assembly reciprocatably mounted in said case, a latch bolt assembly reciprocatably mounted in said case, and an auxiliary bolt member reciprocatably mounted in said case, said dead bolt assembly including a rocker mechanism pivotally mounted in said case, a rollback mechanism rotatably mounted in said case in operative engagement with said latch bolt assembly, a blocker member pivotally mounted in said case and a connection between said auxiliary bolt member and said blocker member adapted to pivot said blocker member to a blocking position behind said latch bolt assembly when said auxiliary bolt member is in depressed position whereby to prevent pry-back of said latch bolt, means mounted on said case in engagement with said blocker when said blocker is in blocking position, a moving engagement between said blocker and said rollback mechanism adapted to move said blocker member out of position blocking retraction of said latch bolt assembly, said auxiliary bolt member including means blocking extension of said dead bolt assembly to extending position when said auxiliary bolt member is in extended position including a slide reciprocatably mounted in said case for movement in a direction transverse relative to said auxiliary bolt member and a movable connection between said dead bolt assembly and said slide, said auxiliary bolt member having a blocking position relative to said slide when said auxiliary bolt member is in extended position whereby to block extension of said dead bolt assembly to extending position and a clear position relative to said slide when said auxiliary bolt member is in retracted position whereby to enable extending of said dead bolt assembly.

3. In a lock including a case, a dead bolt assembly reciprocatably mounted in said case, [a latch bolt assembly reciprocatably mounted in said case,] and an auxiliary bolt member reciprocatably mounted in said case, said dead bolt assembly including a rocker mechanism pivotally mounted in said case, said auxiliary bolt member including means blocking extension of said dead bolt assembly to extended position when said auxiliary bolt member is in extended position comprising a slide reciprocatably mounted in said case for movement in a direction transverse relative to said auxiliary bolt member, a movable connection between said dead bolt assembly and said slide, said auxiliary bolt member having a blocking position relative to said slide when said auxiliary bolt member is in extended position whereby to block extension of said dead bolt assembly to extended position and a clear position relative to said slide when said auxiliary bolt member is in retracted position whereby to enable extension of said dead bolt assembly to extended position.

4. In a lock including a case, a dead bolt assembly reciprocatably mounted in said case, [a latch bolt assembly reciprocatably mounted in said case,] and an auxiliary bolt member reciprocatably mounted in said case, said dead bolt assembly including a dead bolt and including a rocker pivotally mounted in said case and in operative engagement with said dead bolt, said auxiliary bolt member including means blocking extension of said dead bolt when said auxiliary bolt member is in extended position comprising an inwardly extending arm on said auxiliary bolt member, a guide in said case, a slide reciprocatably mounted in said case in sliding engagement with said guide for movement in a direction transverse relative to said arm, a movable connection between said rocker and said slide, said arm having a blocking position relative to said slide when said auxiliary bolt member is in extended position whereby to block movement of said rocker and extension of said dead bolt and a clear position relative to said slide when said auxiliary bolt member is in retracted position whereby to enable extension of said dead bolt.

References Cited

The following references, cited by the Examiner, are of record in the patented file of this patent or the original patent.

UNITED STATES PATENTS

| | | | |
|---|---|---|---|
| 1,158,845 | 11/1915 | Prinzler | 70—151 |
| 1,206,896 | 12/1916 | Page | 70—151 |
| 2,821,849 | 2/1958 | Schweitzer | 70—151 XR |
| 3,242,706 | 3/1966 | Check | 70—150 |

MARVIN A. CHAMPION, Primary Examiner

J. R. MOSES, Assistant Examiner

U.S. Cl. X.R.

70—107, 151; 292—169